(12) United States Patent
Guzelsu

(10) Patent No.: US 6,381,587 B1
(45) Date of Patent: *Apr. 30, 2002

(54) METHOD AND SYSTEM FOR STANDARDIZING AND RECONCILING INVOICES FROM VENDORS

(75) Inventor: H. Isil Guzelsu, Princeton, NJ (US)

(73) Assignee: Citibank, N.A., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,044

(22) Filed: Apr. 2, 1998

Related U.S. Application Data (60) Provisional application No. 60/040,909, filed on Apr. 2, 1997.

(51) Int. Cl.$^7$ ............................................. G06F 17/60
(52) U.S. Cl. ............................................. 705/40; 26/34
(58) Field of Search ............................. 705/34, 26, 27, 705/29, 1, 25, 28, 35, 37, 38, 39, 40, 42, 43, 44

(56) References Cited

U.S. PATENT DOCUMENTS

| | | | |
|---|---|---|---|
| 4,642,767 A | | 2/1987 | Lerner |
| 4,799,156 A | * | 1/1989 | Shavit et al. ............... 705/26 |
| 4,992,940 A | * | 2/1991 | Dworkin .................... 705/26 |
| 5,224,034 A | | 6/1993 | Katz et al. |
| 5,287,270 A | | 2/1994 | Hardy et al. |
| 5,383,113 A | | 1/1995 | Kight et al. |
| 5,390,113 A | | 2/1995 | Sampson |
| 5,465,206 A | | 11/1995 | Hilt et al. |
| 5,583,759 A | | 12/1996 | Geer |
| 5,666,493 A | * | 9/1997 | Wojcik et al. .............. 705/26 |
| 5,694,551 A | * | 12/1997 | Doyle et al. ............... 705/26 |
| 5,717,989 A | * | 2/1998 | Tozzoli et al. .............. 705/37 |
| 5,757,917 A | * | 5/1998 | Rose et al. ................. 380/25 |
| 5,758,327 A | * | 5/1998 | Gardner et al. ............. 705/26 |
| 5,790,664 A | * | 8/1998 | Coley et al. ................ 380/4 |
| 5,870,717 A | * | 2/1999 | Wiecha ..................... 705/26 |
| 5,883,954 A | * | 3/1999 | Ronning .................... 380/4 |

FOREIGN PATENT DOCUMENTS

| | | | |
|---|---|---|---|
| WO | WO 97/29445 | * | 8/1997 |
| WO | WO 98/44442 A1 | * | 10/1998 |

OTHER PUBLICATIONS

Timeslips Deluxe for Windows. Timeslips Corporation. 1995.*

"1990 Products of the Year." Teleconnect. vol. 9, No. 1, p. 64(12). Jan., 1991.*

* cited by examiner

Primary Examiner—Eric W. Stamber
Assistant Examiner—Susanna Meinecke-Díaz
(74) Attorney, Agent, or Firm—Kramer Levin Naftalis & Frankel LLP

(57) ABSTRACT

A system for managing requests for services from vendors including a database having contract information for vendors, entitlement information for users and requests for services. The requests are compared with the entitlement information for the requesting user and the contract information for the vendor that supplies the information to determine if the request is approved. If the request is approved, the system generates an associated billing item in the database for the request and the approved request is transmitted to the vendor. The vendor sends an invoice of charges associated with the approved requests which is compared with the associated billing items for the approved requests. Additionally, a method for managing user requests for services from vendors is provided including providing a database for storing contract information for vendors, entitlement information for users and requests for services from a vendor. The method includes generating a request for services from a vendor and transmitting the request to the database. The method compares the request for services to entitlement information for the user and contract information for the vendor, and generates an approved request and an associated billing item in the database. The method includes receiving from the vendor an invoice of charges associated with the approved request and comparing the invoice with the associated billing item for the approved request.

9 Claims, 8 Drawing Sheets

METHOD AND SYSTEM FOR STANDARDIZING AND RECONCILING INVOICES FROM VENDORS

CROSS REFERENCE TO RELATED APPLICATIONS

The present application claims the benefit of U.S. Provisional Application Ser. No. 60/040,909, filed Apr. 2, 1997 by the inventor herein.

BACKGROUND OF THE INVENTION

The present invention relates to a system and method for tracking products and services usage; and more particularly to a system and method of storing information about vendor contracts, user entitlements to the vendor products and services and requests for a product or services, as well as tracking changes in a database. The system and method allows for comparing costs charged for the requests and actual usage against vendor invoices. The system and method can handle different vendor billing methods such as flat fees, a fee per request, monthly tiered fees and various methods of applying a discount. The system and method can also track changes in user entitlements to different vendor products and services.

A preferred embodiment shows the invention being applied to the financial services industry. Financial institutions such as major banks, brokerage houses, insurance companies and the like rely on information provided by specialized financial and market data service providers. Many financial institutions may subscribe to well over 100 different national and international news and price feed information services. A typical large bank may spend an average of $12 M annually on such services.

Within the large financial institutions, individual users, such as analysts, traders and the like will be entitled to have access to particular market data products and services, generally determined by their department or division, as is appropriate for that user. Typically, a centralized management department, typically a help desk function, within the company will assign the access rights for a particular user to a particular product or service. A user's unique set of available market data services, or entitlements needs to be managed and tracked. These entitlements, for example, can change or remain with a user if that user changes departments, or moves its physical desk.

Typically, physical moves within a company or between departments are frequent, especially at banks or other financial institutions and there is a higher-than-average turnover ratio in the financial services industry. For example, in many banks, two-year training programs for analysts start every summer and service entitlements must frequently be added or deleted for the new users to keep up with current staffing.

Management of the resources involved in accessing on-line information from vendors can raise additional complications. Certain services may require specialized hardware or licensed software to be used in accessing the information. Additionally, certain dedicated modems or phone lines may have to be provided. When a physical move of a user is planned, decisions on whether to move the hardware and other infrastructure needs to be made. If a new user occupying the seat will require the same resources as were there, then only the changes in the user name are needed. Often, however, physical equipment or software will have to be moved.

The many market data and information services vendors typically invoice for their services on a monthly basis and charge rates that are related to the number of users within the financial service client. Often the rate structures can be a flat monthly fee for a user. Alternatively, a flat fee for the company may be charged (in which case the present system is useful for providing an automated method of posting charge-backs to the department or user), or a fee per request or for line usage time may be used. Finally, tiered pricing schedules and volume or other discounts need to be tracked.

In many of the large financial institutions, a typical vendor's printed invoice may be an inch thick and contain thousands of line items. Since services and entitlements may be charged based on a monthly fee, for example, often when additions or deletions of users are made to an account, such changes appear on the following month invoice as a series of debits and credits. For example, if a bank deletes an entitlement in the middle of March for one user, the monthly invoice for that service will typically include a charge for one month's usage by the user. The remaining days in March not actually used are then credited on the April invoice.

Because of the extensive amount of data required in tracking individual user entitlements and reviewing the hundreds of monthly invoices, typically a financial service company can only conduct a summary review of the invoices. In general, if an invoice remained fairly constant on a month-to-month basis, it is generally paid without any further detailed reconcilement. For an invoice that is more than marginally different from the month-to-month average, a firm can spend up to three to four weeks per month reconciling and charging back these invoices.

In addition to invoice reconcilement and billing, there is a need within the financial institutions for managing the related functions of procurement and contract management for the market data services; hardware and software inventory control, and help desk support; managing moves and changes among users and among user entitlements; and managing internal departmental charge backs where the fees for the market data services are apportioned to the appropriate department or user. In the current state of affairs for typical financial institutions, disparate manual and automated systems are used for one or another of these various functions and often cause duplicate processing and data entry throughout the various responsible areas within the financial institution.

What is desired is a system and method that can track vendors and contract related data, including costs for every type of service provided by the vendors. The system should maintain complete information on market data service contracts, with on-line update of service terms and usage. The system preferably tracks vendors, contracts, products, services, various vendor pricing methodologies, delivery and third-party billing information.

It is also desirable for the system to process and reconcile invoices from the vendors. For example, the system should reconcile vendor invoices against individual usage data. It would be most desirable for the system to receive electronic invoices for direct import into the system from the market information service vendors. The system then automatically calculates costs based on an inventory of actual requests for information, and calculates unit costs for services based on the various vendor pricing methodologies. The system should automate the reconciliation of charges against usage data and provide appropriate charge back reports.

It is desired to provide an internal charge back processing function which can allocate monthly market data costs back to the financial service institution user or department. Unit costs for all services are calculated at various levels and pricing methodologies and include an appropriate allocation for direct usage charges, shared account level charges and company site license type allocations. In the past, this function has been a manually intensive, imprecise and incomplete process.

The system desirably contains a real-time inventory of locations, hardware, software and entitlements for users or employees. Historical usage information should also be maintained by the system to verify new charges and credits with the vendors.

The system should manage help desk functions, such as moving a user or changing a user's entitlements. Preferably, the system can create "tickets" for repairs and work orders covering equipment, market data services, and general hardware or software help. The system should desirably also track calls to a help desk and record completion of help desk requests.

The system should also have the capability of planning and implementing both small and large-scale moves of multiple employees or users, entitlements and equipment from one seat to another. Employees, entitlement and equipment should be able to be moved independently from one another. Once a particular move is planned, the system generates and tracks the individual "tickets" or work orders which are needed to perform the move. Work orders are then routed automatically to the appropriate department, vendors and contractors who will be performing the individual tasks.

The system and method of the present invention satisfies all of the above needs and advantageously provides a complete integrated solution to meet the disparate requirements of the various departments that manage, use and implement market information and data services. It eliminates duplicate efforts and the intensive manual processing of invoices, move processing and work order tracking. The system and method is able to monitor and prevent duplicate services from being received at certain seats where multiple vendors are providing the same data to the user. The system and method is able to reconcile and uncover discrepancies between line item totals and invoice amounts relative to the entitlements of individual users. The system and method of the present invention can enable a financial institution to perform a complete line-by-line audit of every vendor invoice which will allow reconciliation of every line item and every mid-month credit and charge.

SUMMARY OF THE INVENTION

The present invention relates generally to a system and method for reconciling vendor invoices for products and services with actual usage by individual users within a company. More particularly, the present invention is a computerized system and method for receiving invoices from vendors and tracking the amounts in the invoices against a database containing information about the vendor service contracts, user entitlements to that service, and actual usage of the service. The system also includes functions for automated tracking and inputting or changing user information, vendor service contract changes, and help desk requests related to the hardware or software used to acquire the data from the vendor products and services.

The system of the invention processes accounts payable in the back office of, for example, the trading floor of a bank or other financial institution. In a particular embodiment of the invention, various traders or other users order on-line market information services, magazines and other information for the purposes of carrying out their job and analyzing the market. Determinations are made whether those products and services are authorized to be purchased, and then they are entered into the system, processed and paid. The system receives invoices from vendors in electronic form, and facilitates reconciling and processing so that the accounts payable department can pay the invoices.

The system of the invention is a fully integrated expense control system and is capable of doing a profit and loss analysis based on the vendor products and services charged for, and the revenue generated by the users requiring those services. The system tracks inventory, reconciles invoices and is capable of educating the business people by generating various reports.

The system and method of the invention is capable of providing a return on investment analysis as well. For example, many of the services from market information providers include a one-month free trial. The system would enable the manager running the department interested in the trial to determine if adding the trial service as an entitlement to the department users would enhance the performance of those receiving that particular service, and thus the manager can evaluate whether the service should be purchased beyond the trial month. Additionally, if different vendors provide similar services, an analysis can be made of which one costs less. The system provides profit and loss accountability allowing business managers the opportunity to determine the actual value of vendor products and services.

In accordance with the invention, a system for managing product and service usage from vendors is provided. The system includes a database having contract information for vendors, entitlement information for users and requests for a product or service from a vendor made by a user. The requests for products and services from a vendor are generated by the user of the system. The requests are compared with the entitlement information for the requesting user and the contract information for the vendor that supplies the product or service to determine if the request is approved. If the request is approved, the system generates an associated billing item in the database for the request. The approved request is transmittable to the vendor. The system receives, from the vendor, an invoice of charges associated with the approved requests, and compares the invoice with the associated billing items for the approved requests.

Additionally, in accordance with the invention, a system for managing user requests for products and services from vendors is provided. The system includes a database for storing contract information for vendors, entitlement information for users and requests for products and services from a vendor. The system includes input/output means operable by a user for generating a request for products and services from a vendor and transmitting the request to the database. The request for products or services is compared to the entitlement information for the requesting user and the contract information for the vendor to determine if the request is approved. The system generates a billing item associated with approved requests and transmits the billing item to the database. The approved request is transmittable to the vendor. The system receives from the vendor an invoice of charges associated with the approved request and compares the invoice with the associated billing item for the approved request.

In accordance with the invention, a method for managing requests for products and services from vendors is provided. The method includes providing a database which stores contract information for vendors, entitlement information for users and requests for a product or service from a vendor. The method includes generating, by a user, a request for a product or service from a vendor, and comparing the request with the entitlement information for the user and the contract information for the vendor to determine if the request is approved. Approved requests are transmittable to the vendor. The method includes generating an associated billing item in the database for approved requests. The method includes receiving from the vendor an invoice of charges associated with approved requests, and comparing the invoice with the associated billing item for the approved request.

Additionally, in accordance with the invention, a method for managing user requests for products and services from vendors is provided. The method includes providing a database for storing contract information for vendors, entitlement information for users and requests for a product or service from a vendor. The method also includes generating, by a user, a request for a product or service from a vendor and transmitting the request to the database. The method compares the request for a product or service to entitlement information for the user and contract information for the vendor, and generates an approved request. The system generates a billing item associated with approved requests and transmits the billing item to the database. The approved request is transmittable to the vendor. The method includes receiving from the vendor an invoice of charges associated with the approved request and comparing the invoice with the associated billing item for the approved request.

An object of the invention is to provide on-line product and service request management between end users and vendors.

It is a further object to provide automation of invoice reconciliation for quantity and dollar amount of products and services used, against a database containing costs and other information for the products and services.

Still another object of the invention is to provide automation of the invoice approval processes by accounts payable.

Yet another object of the invention is to provide end user charge notification by an on-line network system.

Still another object of the invention is to provide automated accrual and financial management tools.

Still other objects and advantages of the invention will, in part, be obvious and will, in part, be apparent from the specification.

The invention, accordingly, comprises the several steps and the relation of one or more of such steps with respect to each of the others, and the system embodying features of construction, combinations of elements and arrangement of parts which are adapted to affect such steps, all as exemplified in the following detailed disclosure, and the scope of the invention will be indicated in the claims.

BRIEF DESCRIPTION OF THE DRAWINGS

For a full understanding of the invention, reference is had to the following description taken in connection with the accompanying drawings in which.

DETAILED DESCRIPTION OF THE PREFERRED EMBODIMENT

The automated system and method of the invention allows, for example, a financial institution to manage a complex array of market data services effectively and efficiently. The system and method allows tracking of and maintaining of the details for the market data services and equipment contracts with the various market data service providers or vendors. The system allows a company, such as a financial institution or bank, to track and maintain vendor services for every user in the company. The system and method allows a manager to plan and execute user moves from seat to seat and the help-desk manager can move all or selected services and equipment for employees.

A database provided by the system is updated automatically when a move is completed. The system can create and track help desk work tickets for all help desk requests, including changes to market data service usage. The market data services database is updated automatically when the ticket is closed.

The system allows for review of service usage and can identify duplications, track monthly changes and costs by user, and perform various functions useful for business and planning. For example, the system of the invention can reconcile monthly vendor invoices against the market data service database of user requests.

Figure 1:
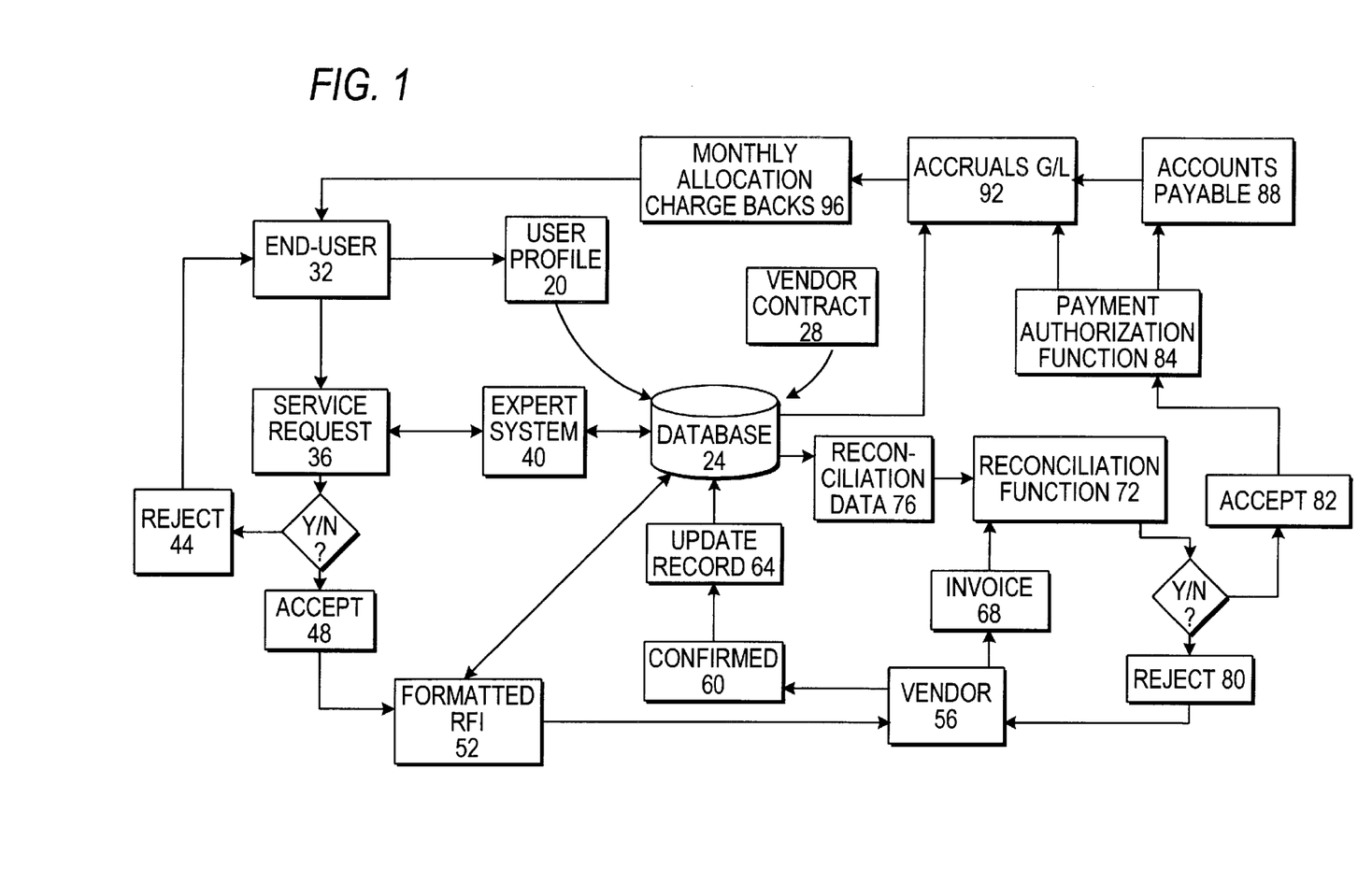
FIG. 1 is a schematic representation of an on-line service management system in accordance with the present invention.

FIG. 1 shows and on-line market data service management system in accordance with the invention. User information is generally tracked by a seat location. For a user, different entitlements to various market data service providers can be made. The entitlements may be grouped for particular departments and a user's entitlements may be based on a profile for that department. The information about a user profile 20 is entered into a database 24. Database 24 constitutes the central repository for all information for managing on-line market data service requests and associated functions.

Database 24 also includes vendor contract information 28 which may generally include the time frame or period for which the contract is valid, and the cost and quantity of services available under the contract. Database 24 also includes additional information to be described below.

Requests for on-line market data are made by an end user 32. End user 32 is identified by a seat location which should match the seat location for that user's entitlement information 20 as entered in database 24. End user 32 will make an on-line market data service request 36, which is judged against business criteria in an expert system 40, which relies on information from database 24 as described below with reference to FIG. 2.

In accordance with the comparison by expert system 40 against business criteria, on-line service request 36 may be rejected 44 and notification to end user 32 provided. Generally, however, end user 32 will make an on-line service request 36 for a market data service to which end user 32 is entitled, as reflected in end user's entitlement information 20 in database 24. Therefore, on-line service request will typically be accepted 48 and the system will prepare a formatted request for information 52 which will include vendor information, service information, optionally an expense code, cost, and contract billing start date and period, all of which information can be retrieved from database 24 and vendor contract records 28.

It is important to recognize that requests for information 36 in the context of the on-line market data service management system in accordance with the invention, can be actual user requests for market data information and can additionally be help desk requests for adding a user, deleting a user, or adding or deleting a service for any given user, all as described further below.

The formatted request for information 52 is transmitted to vendor 56 and vendor 56 will transmit a confirmation back to the system 60, thus assuring that an accurate record of the request has been received by vendor 56 and database 24. Once the formatted request for information 52 is confirmed 60 by vendor 56, database 24 is updated 64 with information about the request. Therefore, database 24 also includes information about actual requests for market data information as well as accurate information for user 32.

Information in database 24 can be used by business managers and planners to forecast charges for market data services and charging back actual costs of those services to the departments or even individual users. In addition, the information in database 24 can be used to reconcile invoices from vendors 56. Vendors 56 prepare a invoice 68 which will include certain standardized fields such as account number and charges. Standardized invoice 68 is transmitted to the system for invoice reconciliation, payment authorization, accrual of charges, and end user charge notification, all indicated at 72. Invoice reconciliation 72 collects reconciliation data 76 from database 24. If invoice reconciliation 72 does not match information in database 24 with invoice 68, the invoice is rejected 80 and sent back to vendor 56. If invoice reconciliation matches information from database 24 with invoice 68, invoice 68 is accepted 82 and the system sends the information to a payment authorization function 84 which prepares the appropriate routing slips and sends the correct forms to accounts payable 88. Information from payment authorization 84 and from accounts payable 88 is transmitted to the accruals and general ledger function 92 which, along with receiving additional information from database 24, provides the financial cycle information for the month and prepares monthly allocations and direct charges back 96 to departments. The monthly allocation and direct charges 96 are transmitted to end user 32 and the tracking and management of on-line market data is complete.

Figure 2:
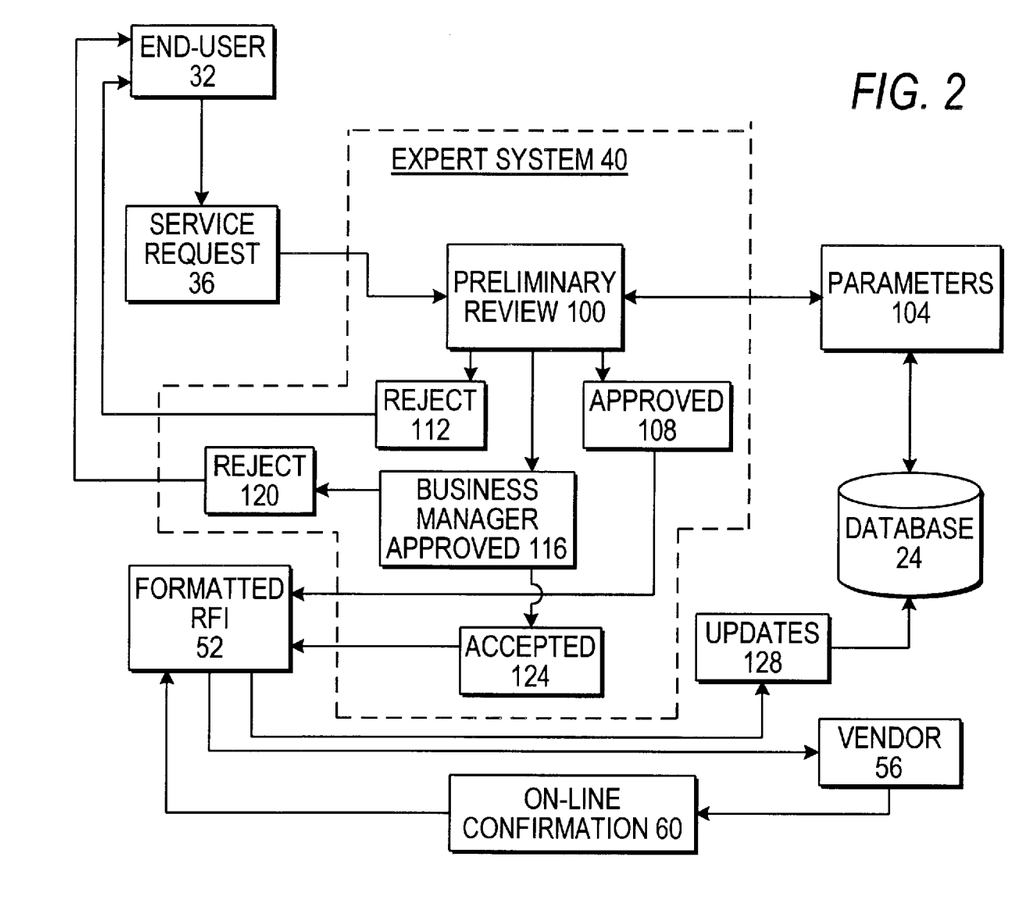
FIG. 2 is a schematic representation of an on-line service request management system in accordance with the present invention.

FIG. 2 shows in greater detail the on-line service request function of the system in accordance with the invention. As described above, end user 32 makes a market data information request 36 and the market data information request 36 is compared with business criteria in an expert system generally indicated at 40. Expert system 40 includes a preliminary review 100 which checks the parameters 104 of information about the user in database 24 to generate an approval 108, after which a formatted request for information 52 is prepared.

Preliminary review 100 may automatically reject 112 the request 36 for any number of reasons, such as end user 32 not being entitled to the requested service. In the case of a rejection 112, end user 32 is notified.

Preliminary review 100 may marginally approve or reject request 36 and provide such information to a business manager approval function 116 which can reject the request 120, notifying user 32, or accept 124 request 36 and prepare the formatted request for information 52 depending on the particular business needs for the request.

As discussed above, formatted request for information 52 is transmitted to vendor 56 for an on-line confirmation 60, and when received, updates 128 database 24.

Figure 3:
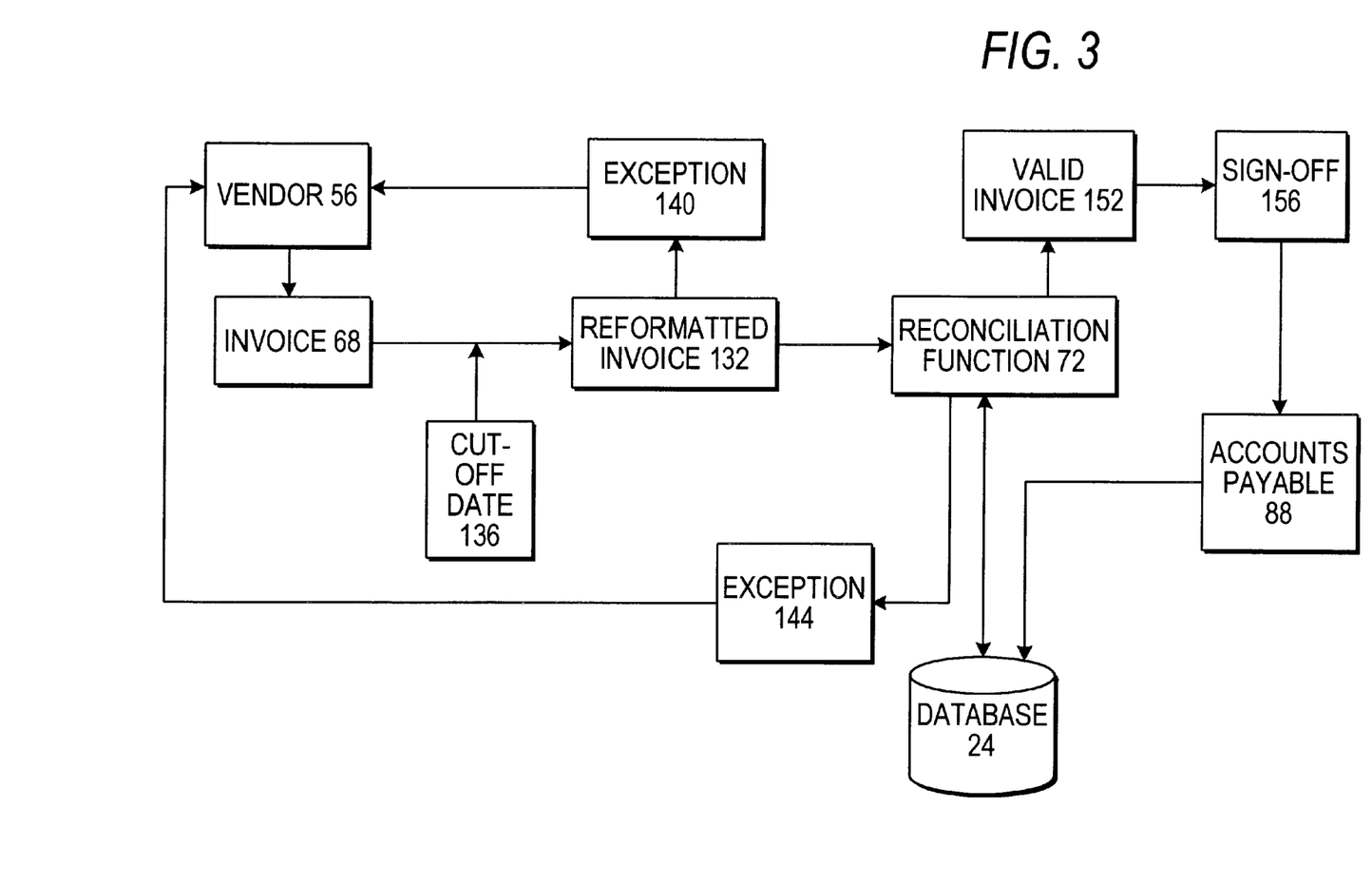
FIG. 3 is a schematic representation of an automated invoice processing and payment authorization system in accordance with the present invention.

FIG. 3 shows in greater detail the automated invoice processing and payment authorization function of the system in accordance with the invention. Vendor 56 receives request for information (not shown) and prepares a standardized invoice 68 which includes certain necessary fields such as the account number, cost, vendor, service and the dates used. The invoice is sent to the system and a reformatted invoice 132 is generated. In order to provide a snapshot of the account information, an arbitrary cut-off date 136, for example, the 15th of the month in the example is used. The standardized reformatted invoice 132 is sent to the automated reconciliation function 72.

If standardized reformatting 132 does not find the necessary information, an exception 140 is made and vendor 56 notified.

Similarly, automated reconciliation 72 may reject an invoice and generate an exception 144 and vendor 56 so notified. Automated reconciliation 72 uses information from database 24 to reconcile the invoices. Automated reconciliation 72 also updates database 24 and prepares a valid invoice 152 for automated sign-off 156. Automated sign-off 156 prepares an internal bill, checks the signatures and compliance and forwards the information to accounts payable 88 which also updates database 24.

Figure 4:
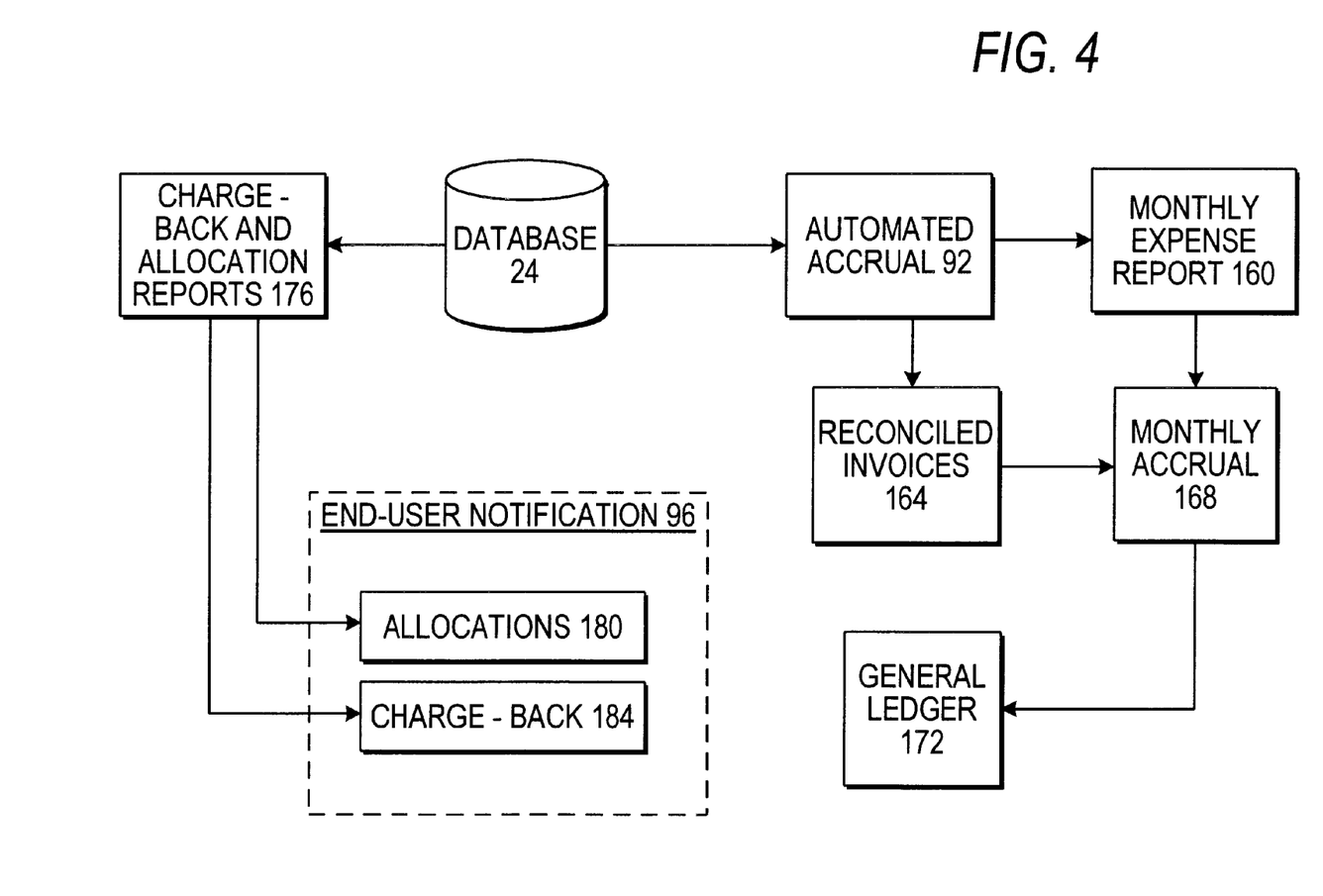
FIG. 4 is a schematic representation of a monthly financial cycle accrual and allocation/direct charge system in accordance with the present invention.

FIG. 4 shows the monthly financial cycle accruals and allocation of the direct charge function of the invention. An automated accrual function 92 can get information from database 24 in order to prepare a monthly expense report 160. Since database 24 also contains current information on reconciled invoices, the amount of reconciled invoices 164 can be subtracted from the monthly expenses to determine the accruals for the month 168. Accruals 168 can be reported by vendor, or account number or expense code as necessary. Information on the monthly accrual 168 can then be sent to the general ledger function 172 and expenses forecasted. Database 24 can also provide charge back and allocation information to the end users. Information from database 24 can be extracted and reported 176 and these reports sent as a notification to the end user 96 which may include allocations 180 or direct charges 184 for that user.

Figure 5:
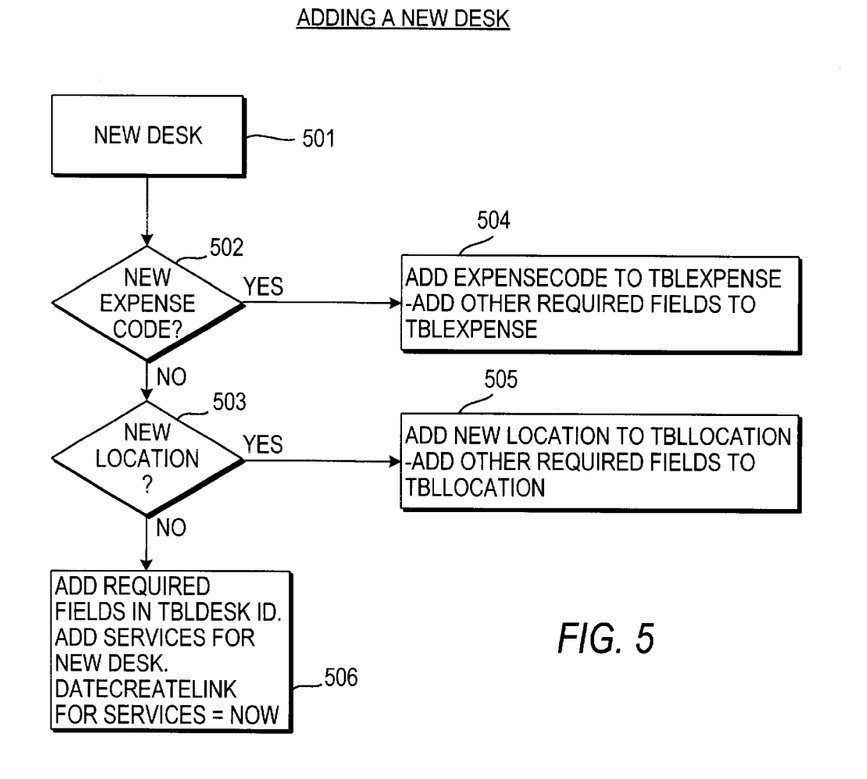
FIG. 5 is a flowchart showing the steps for adding a new desk in accordance with the system and method of the present invention.

As described above, a user of the system in accordance with the invention is assigned a seat number which generally corresponds to a physical desk. When a new user is added to the system, a request to the help desk is made for adding a new desk. The help desk adds a new desk in accordance with the method shown in FIG. 5. The new desk 501 is generated. It is determined whether a new expense code 502 is needed for this desk. If not, it is determined whether this new desk is physically at a new location 503. If, on the other hand, a new expense code 502 is generated, an expense code is added 504 to the master tables and the new location is added 505. Similarly, if it is not a new expense code 502 but it is a new location 503, the new location is added 505 to master tables. Then, all required fields are updated 506 to the master tables. Also, if new location 503 is not required, then required fields are updated 506 in the master tables for the desk.

Figure 6:
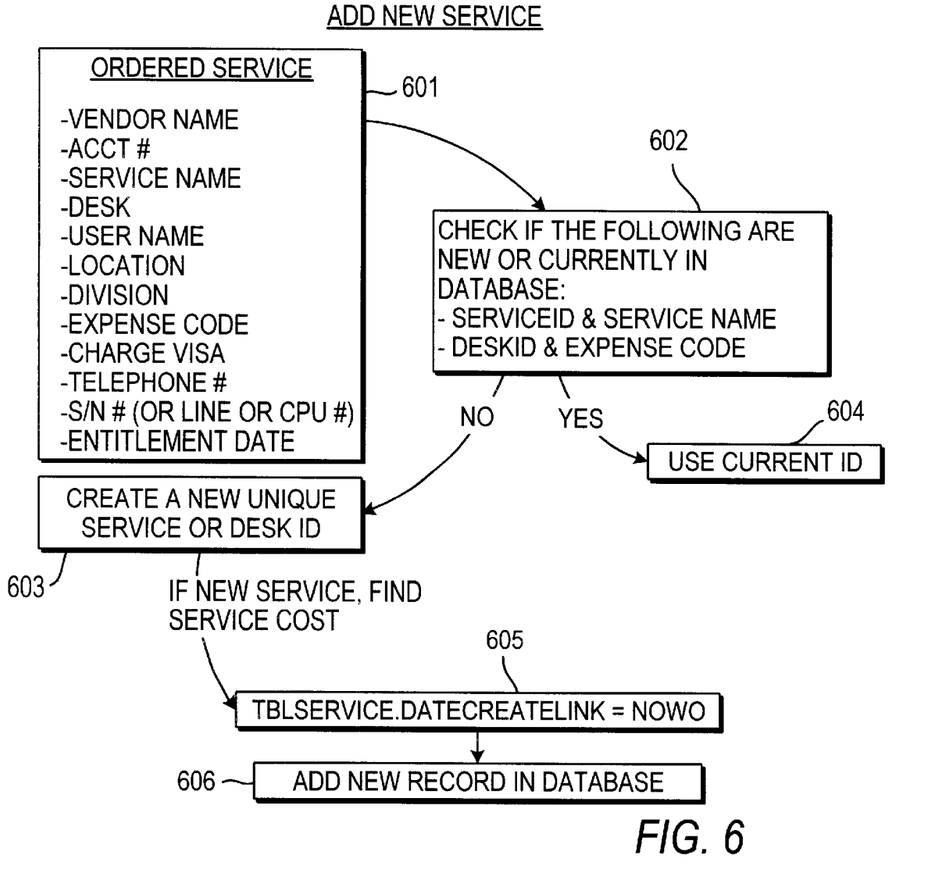
FIG. 6 is a flowchart showing the steps for adding a new service in accordance with the system and method of the present invention.

New services can be added to an existing seat or desk. The method for adding a new service is shown in FIG. 6. For any new market data service vendor, for which an entitlement is to be given to a new desk, a ticket 601 is filled out for the help desk which will include information such as vendor name and account number, service name, user name desk at location, and the like. The service i.d. and desk i.d. codes are checked to see if they currently exist in the data base 602 and if not, new unique service or desk i.d.'s are created 603. If the service codes exist in the master data files, the current i.d.s are used 604. In either case the master data tables are updated with the new information 605 and the new record is added to the database 606.

Figure 7:
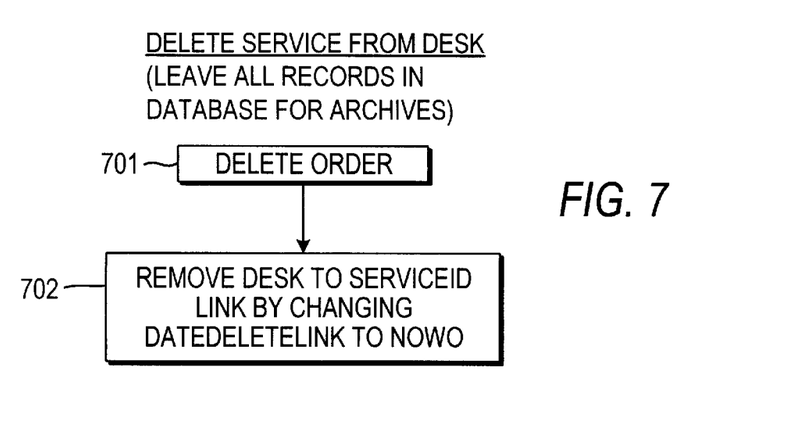
FIG. 7 is a flowchart showing the steps for deleting a service from a desk in accordance with the system and method of the present invention.

Likewise, services may be deleted from a desk where a user's entitlement no longer includes that service. The method is shown in FIG. 7. A delete order 701 is filled out and transmitted to the help desk and the desk is removed by modifying the master table 702 by the help desk.

Figure 8:
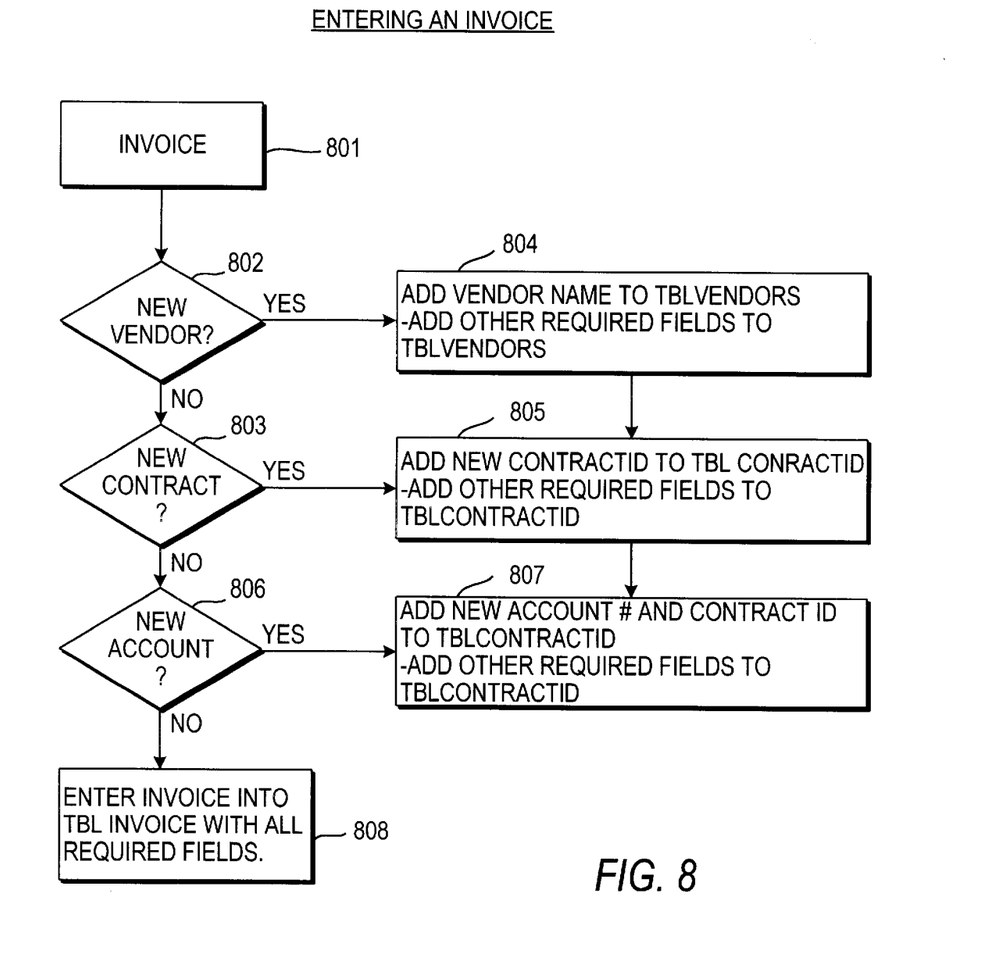
FIG. 8 is a flowchart showing the steps for entering an invoice in accordance with the system and method of the present invention.

Invoices from vendors are entered into the system by the method shown in FIG. 8. A new invoice 801 is received and it is determined whether it is from a new vendor 802. If it is not, it is determined whether it is a new contract 803. On the other hand, if it is a new vendor 802, then the new vendor name is added 804 to the vendor data in the master tables and new contract i.d. information is also added 805. Likewise, if it is a new contract 803, new contract information is added 805.

However, if it is not a new vendor 802 and it is not from a new contract 803, it is determined whether a new account is being invoiced 806. If it is a new account 806, the new account information is added 807 to the master table and the invoice is entered 808 into the database. Likewise, if it is not a new account, the invoice can also be added 808 directly to the database.

Figure 9:
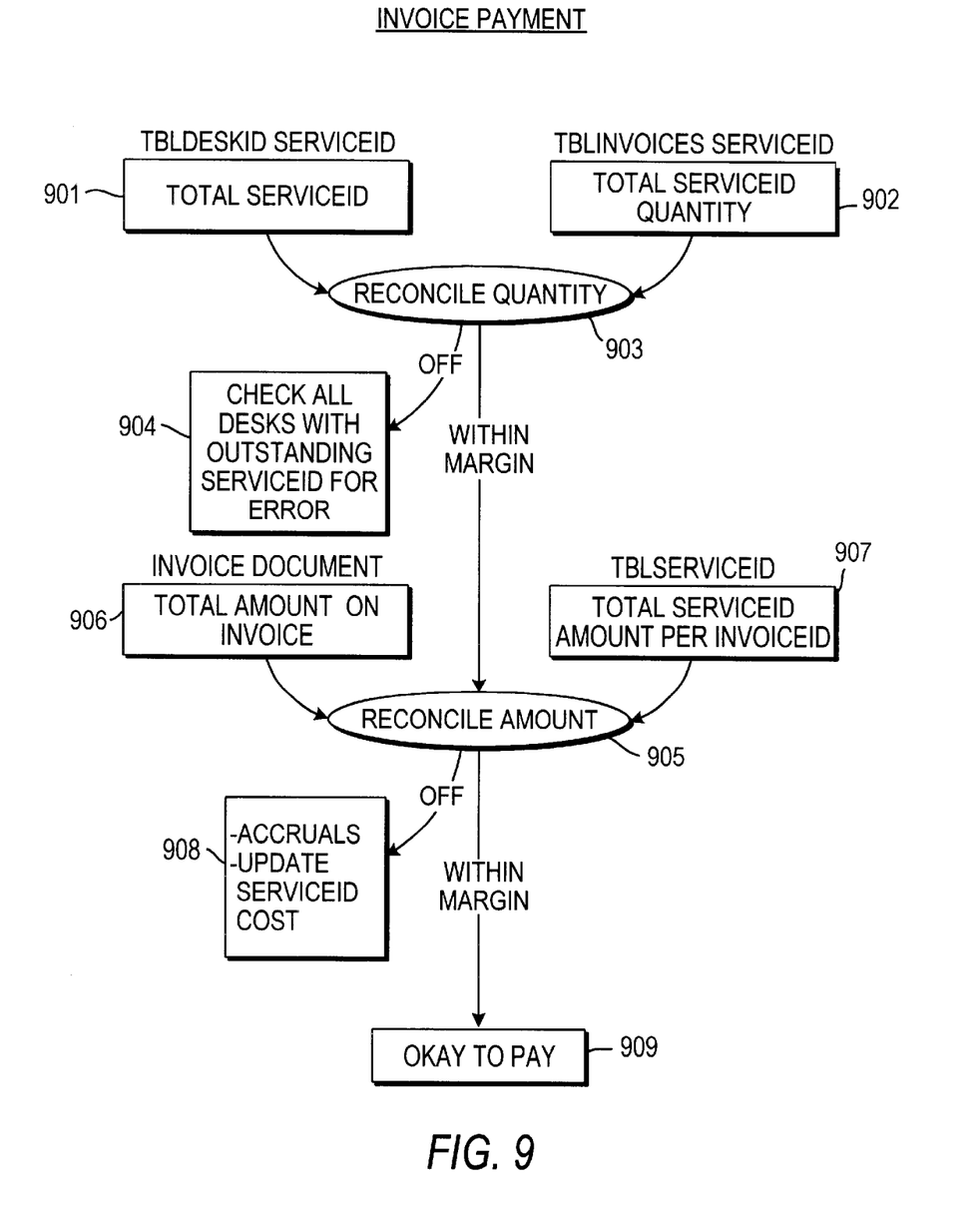
FIG. 9 is a representation showing the steps for paying an invoice in accordance with the system and method of the present invention.

Once the invoice is in the system, the invoice payment process can occur as shown in FIG. 9. The system looks up the total service count 901 and quantity 902 from the stored data information in the database. The quantity is reconciled 903 by comparing the total service count 901 with total service quantity 902. If the reconciliation 903 is off, all desks are checked for outstanding service i.d. errors 904. If, on the other hand, the reconciliation is within tolerances, the amount is reconciled 905 by comparing the total amount on the invoice 906 and the amount 907 from the database. Again, if the amount reconciled is off, data is sent to the accrual data base and the service i.d. is updated 908 or, if the reconciled amount 905 is correct, the system indicates that it is okay to pay 909.

The system and method is preferably implemented by software on a computer and preferably takes the form of a graphic user interface application. Managers and users may have different functions available to them, depending on the configuration of the system. A "help desk" function is available to access the help desk ticket entry and move functions described above, and allows a manager to assign market data services to specific users. A market data function allows users or managers to access and request market data services.

The system of the invention in the preferred embodiment helps a financial institution manage market data services. The help desk has access to update the market data service master tables, and can define vendor products and services, track and maintain service usage, review service usage, import and reconcile vendor invoices, process data and run reports.

Different vendor products and services can have different charge back types, which determine how the cost of a service will be billed to users. Service types generally come in two predefined types, for example, and additional service types can be defined as needed. The pre-defined service types are individual services, that is the seat to which the service is assigned pays the full cost of use of that service. The other type of service is a shared account in which the total cost for all units of the service delivered to an account is shared among all seats receiving any service from that account. For example, if five units of the service are delivered to an account, and ten seats receive a service through that account, the cost of the five units is divided evenly among the ten seats.

A billing type is used to indicate how a service is billed by the vendor. Typical billing types include third-party billing in which a service is billed by the vendor originating the service (the third-party vendor) rather than the delivering vendor. Delivering vendor billing is where services are billed by the vendor delivering the service regardless of where the service originates.

Market information products and services are purchased from vendors. The vendor's product or service is listed in the vendor master tables. Vendor master tables include information for the vendor, vendor contacts, vendor products and vendor services. Basic name and address information for the market data information vendor can appear on a vendor data screen. Vendor products are defined on a products screen. Some vendors offer clearly defined products, such as Telerate's "digital fee." Other vendors may offer only a single suite of services with no product name, or only individual services. Market data services received from the vendor are separately defined on a vendor services screen. Service codes for associated charges, such as site charges, that are billed monthly may be indicated in the vendor services screen.

Additionally a vendor service may include an indication if the service pricing is tiered. Tiered pricing is used to handle a number of pricing situations as described below. Additionally, a discount rate offer by the vendor, whether a discount applies, may be indicated. Finally, if the services are charged through a third-party vendor rather than the delivering vendor, another indication can be made.

Tiered pricing is used for certain pricing situations. Classic tiered pricing, such as when 1–4 units cost $100 per unit and 5–9 units cost $80 per unit and so on; first unit pricing, as when the first unit cost $50 and all additional units cost $10; tiered percentage discounts as when 1–4 units are not discounted and additional units receive a 10% discount and so on (mathematically equivalent to classic tiered pricing); and site fees. Preferably site fees can be handled in a different manner, but it is possible to include the site fee as part of the first unit cost.

Service usage is tracked in a service usage and invoice screen. On this screen a user can input account, contact and invoice data and can review data from vendors. When the user accesses the service usage and invoices screen, typically they will select a vendor name from a vendor name drop down box. Vendors can be added in the vendor data screen by the help desk. The user can enter or edit the number of units which are purchased in a month under the site license contract for the service. To add or edit other information, the user can go to other screens.

In most cases, one account number is associated with one account. If the contract covers five units of a service, the cost of those units is allocated among all seats that receive one or more individual services through that account.

The invoices function permits a manager to enter vendor invoices for reconciliation against market data information service provider invoices. The manager can view or edit invoices that have been imported electronically. Different vendors provide a different set of data fields in their invoices. However, it is preferable that at least certain data fields are in common. Typically the invoice records will include fields for vendor service, vendor service code, a start and end date of billing for this service, quantity of service billed, unit cost, charged amount, discount percent, discount amount, tax rate percent, tax amount and final cost. Once the invoices are in the system, the manager can access the reconcile function to go directly to the reconcile invoices screen. The currently selected invoice will be entered on that screen.

The system allows managers and the help desk to process the data and generate report files or compute cost per seat amounts and the allocation of vendor service cost to individual seats. For services defined as individual, non-licensed, and non-tiered priced, the process is simple. The unit cost of this service, after discounts and taxes, is charged to the seats receiving this service. For other services, the cost per seat depends on the number of seats receiving this service. This is true for licensed tiered price and shared account services. Computing these costs for the entire site has typically been a time consuming process. For that reason most marketing data service management system reports do not recompute cost per seat when they are run. Instead, they rely on figures generated by the reporting and history functions.

The help desk portion of the market data service management system allows a user to effect moves of a user or equivalent and services from one seat to another, or to add or delete services, equipment and network I.D. from a particular seat.

Accordingly, the present invention provides a method and system for tracking user requests for services and invoices from vendors in a comprehensive and efficient manner. The system and method are adaptable and useable with many different programs and activities.

It will thus be seen that the objects set forth above, among those made apparent from the preceding description, are efficiently attained and, since certain changes may be made in carrying out the above method and in the constructions set forth without departing from the scope of the invention. It is intended that all matter contained in the above description and shown in the accompanying drawings shall be interpreted in an illustrative sense and not in a limiting sense.

It is also to be understood that the following claims are intended to cover all of the generic and specific features of the invention herein described and all statements of this scope of the invention which, as a matter of language, might be said to fall there between.

I claim:

1. A computer implemented system for managing a plurality of user requests for services provided by vendors, comprising:
    a database storing contract information for vendors, entitlement information for users and a plurality of billing items associated with user requests for services provided by a vendor;
    means for generating a user request for services provided by a vendor, and for comparing said user request with said entitlement information for said user and said contract information for said vendor to determine if said user request is an approved request;
    means for including a billing item associated with said approved request in said database, and means for transmitting said approved request to said vendor;
    means for receiving from said vendor an invoice of charges for services associated with a plurality of approved requests including said approved request, and for comparing said invoice with said plurality of billing items including said billing item; and
    means for allocating in accordance with said billing item a portion of said invoice to said user generating said approved request; whereby users receiving services from said vendor are charged an appropriate portion of said invoice in accordance with those services said users received from said vendor.

2. The computer implemented system of claim 1 wherein said invoice of charges includes a monthly fee per user.

3. A computer implemented system for managing a plurality of user requests for services provided by vendors, comprising:
    a database for storing contract information for vendors, entitlement information for users and a plurality of billing items associated with user requests for services provided by a vendor;
    input/output means operable by a user for generating a user request for services provided by a vendor;
    means for comparing said user request for services to entitlement information for said user and contract information for said vendor, and generating an approved request in response thereto;
    means for generating a billing item associated with said approved request and transmitting said billing item to said database;
    means for transmitting said approved request to said vendor;
    means for receiving from said vendor an invoice of charges for services associated with a plurality of approved requests including said approved request and comparing said invoice with said plurality of billing items including said billing item; and
    means for allocating in accordance with said billing item a portion of said invoice to said user generating said approved request; whereby users receiving services from said vendor are charged an appropriate portion of said invoice in accordance with those services said users received from said vendor.

4. The computer implemented system of claim 3 wherein said invoice of charges includes a monthly fee per user.

5. A computer implemented method for managing a plurality of user requests for services provided by vendors, comprising:
    providing a database storing contract information for vendors, entitlement information for users and a plurality of billing items associated with user requests for services provided by a vendor;
    generating a user request for services provided by a vendor, and comparing said user request with said entitlement information for said user and said contract information for said vendor to determine if said user request is an approved request;

transmitting said approved request to said vendor;

generating a billing item in said database for said approved request;

receiving from said vendor an invoice of charges for services associated with a plurality of approved requests including said approved request, and for comparing said invoice with said plurality of billing items including said billing item; and allocating in accordance with said billing item, a portion of said invoice to said user generating said approved request; whereby users receiving services from said vendor are charged an appropriate portion of said invoice in accordance with services said users received from said vendor.

6. The computer implemented method of claim 5 wherein said invoice of charges includes a monthly fee per user.

7. A computer implemented method for managing a plurality of user requests for services provided by vendors, comprising:

providing a database for storing contract information for vendors, entitlement information for users and a plurality of billing items associated with user requests for services provided by a vendor;

generating a user request for services provided by a vendor;

comparing said user request for services to entitlement information for said user and contract information for said vendor, and generating an approved request in response thereto;

generating a billing item associated with said approved request and transmitting said billing item to said database;

transmitting said approved request to said vendor;

receiving from said vendor an invoice of charges for services associated with a plurality of approved requests including said approved request, and comparing said invoice with said plurality of billing items including said billing item; and allocating in accordance with said billing item, a portion of said invoice to said user generating said approved request; whereby users receiving services from said vendor are charged an appropriate portion of said invoice in accordance with services said users received from said vendor.

8. The computer implemented method of claim 7 wherein said invoice of charges includes a monthly fee per user.

9. A computer implemented method for managing a plurality of requests from users in an organization for services provided by vendors, comprising:

providing a database storing entitlement information for users in an organization based on at least one of the users' position and assigned physical location in said organization, contract information for vendors, and a plurality of billing items associated with user requests for services provided by a vendor;

generating a request from a user for services provided by a vendor, said user being identified by at least one of said user's position and assigned physical location in said organization;

comparing said user request with said entitlement information for said user and said contract information for said vendor to determine if said user request is an approved request;

transmitting said approved request to said vendor;

generating a billing item in said database for said approved request;

receiving from said vendor an invoice of charges to said organization for services associated with a plurality of approved requests including said approved request;

comparing said invoice with said plurality of billing items including said billing item to determine if said invoice is accurate;

authorizing payment for said accurate invoice;

allocating in accordance with said billing item, a portion of said invoice to said user generating said approved request based on at least one of said user's position and assigned physical location in said organization; whereby users receiving services from said vendor are charged an appropriate portion of said invoice in accordance with services said users received from said vendor.

\* \* \* \* \*